United States Patent Office 3,174,950
Patented Mar. 23, 1965

3,174,950
POLYURETHANES FROM TRIS(β-HYDROXY-ETHYL)ISOCYANURATE AND DIPHENYL-METHANE DIISOCYANATE
David E. Cordier, Hamden, Conn., assignor, by mesne assignments, to The Upjohn Company, Kalamazoo, Mich., a corporation of Delaware
No Drawing. Filed Jan. 23, 1961, Ser. No. 83,879
21 Claims. (Cl. 260—77.5)

This is a continuation-in-part of Serial No. 811,514, filed May 7, 1959, now abandoned.

The present invention is concerned with novel reaction products that are useful for purposes requiring electrical, chemical and mechanical integrity under relatively severe conditions of service. More particularly, it is concerned with film forming reaction products of aromatic diisocyanates and polyhydric alcohols.

Reaction products of aromatic diisocyanates or aromatic polyisocyanates and various dihydric alcohols and trihydric alcohols are known that give useful films. It has also been known to prevent reaction between these ingredients until thermally activated. This has been accomplished by prereacting the di- or polyisocyanates with so-called blocking agents. These have ranged from the phenolic materials through the acetoacetic esters to hydrogen cyanide. Many such systems have been described in which such di- or polyisocyanates have been reacted with blocking agents that permit single component mixtures with diols, triols, and the like that react to provide film forming materials only when thermally activated. The principle is well known and documented that the blocking agent forms a less thermally stable compound with the di- or polyisocyanate than the diol, triol, or the like component of the system forms, with the result that on thermal activation the blocking agent is volatized, leaving the new reaction products formed between the diol, triol, or the like and the di- or polyisocyanate. The film forming properties of such materials are well known and widely used, despite severe limitations.

The prior art has also resorted to various means of attempting to overcome some of the deficiencies of the foregoing procedures. One widely used procedure is to pre-react a di-isocyanate with a triol in such a way that only one isocyanate group of each di-isocyanate molecule is involved in the reaction with the triol. In such systems where thermal activation is desired the resulting residual isocyanate groups are then further reacted with a blocking agent, such as a phenolic material, which is then mixed with appropriate solvents and diluents if desired, and is mixed with a diol or triol. This system is then coated or may be used to cast films that on heating lose blocking agent, solvents and form polyurethane films. Such materials are used for magnet wire enamels that are self-fluxing when soldered, and have been used for other metal coatings. All of the materials of the prior art suffer from the common disadvantage that they lose their desirable properties on more or less protracted exposure to elevated temperatures. Among the properties that suffer serious debility on heat ageing are adhesion, film continuity and integrity, insulation properties for electricity, hardness, and solderability. Temperatures of the order of 140° C. cannot be tolerated for long by the prior art materials, and temperatures of 175–180° C. cannot be tolerated even for short periods by such materials.

I have discovered that a diisocyanate such as methylene bis-phenylisocyanate will react with the monomeric organic chemical tris(β-hydroxyethyl)isocyanurate to form adherent, continuous, electrically insulative, abrasion-resistant, hard, tough, flexible films on metal that are unaffected by very prolonged exposure to temperatures of 175° C. These coated films are unaffected by most organic solvents even at elevated temperatures, and have thermoplastic flow only at temperatures in excess of 250° C.

Despite this degree of heat resistance, these coated films are self-fluxing in contact with molten solder, permitting metal that has been coated therewith to be soldered without the necessity of mechanical removal of the film.

The diols, triols, polyols that have been heretofore used in coating compositions have been described as polymeric materials. Therefore it is all the more surprising that the compositions of the present invention encompass such a profound improvement over the prior art, when applied as coating materials to metal surfaces.

My invention also comprises the process of reacting methylene bis-phenylisocyanate (MDI), also known as diphenyl methane diisocyanate with tris(β-hydroxyethyl)-isocyanurate and the products therefrom. The methods used for conducting this reaction are important to the result of obtaining evenly distributed films on metal by practical means of application, but are not to be construed as the only means of obtaining the novel reaction product, nor for that matter, the only way of obtaining evenly distributed films on metal. Methylene bis-phenylisocyanate is well known in commerce and is usually referred to as MDI. Commercial names for suitable products are: "Mondur M," "Nacconate 300." Tris(β-hydroxyethyl)isocyanurate is also commercially available. Tris (β-hydroxyethyl)isocyanurate has the following physical constants:

It melts at 130–132° C.

Anal. calculated for $C_9H_{15}N_3O_6$: C, 41.38; H, 5.79; N, 16.09

Anal. found for $C_9H_{15}N_3O_6$: C, 41.67; H, 5.87; N, 16.18

Its infra-red spectrum in KBr showed the following bands: 2.95 m., 3.0 m. and 3.1 m. for hydroxyl and 5.93 m. for >N—C—N<. These absorptions are in agreement with its assigned structure.

In certain types of products discussed in greater length hereinafter, it may be desirable to incorporate other reactants containing alcoholic hydroxyl groups, which are reactive with isocyanate. Various alkyld resins or other material containing at least two alcoholic hydroxyl groups may be used for this purpose. However, in order to realize the objectives of the invention, it is desirable that the amount of tris(β-hydroxyethyl)isocyanurate should be sufficient to provide at least 10% of the total quantity to alcohol hydroxyl groups. As to the amount of total isocyanurate groups in proportion to the total alcoholic hydroxyl groups, it is desirable that this ratio (NCO:OH) be within the range 2:3 to 3:2. Although particular types of such hydroxyl containing reactants are mentioned, it will be apparent that substantial advantages can be realized by adding the indicated quantities of tris(β-hydroxyethyl)isocyanurate to other types of systems. Hence, they also fall within the ambit of the present invention.

Following is a description of procedures for making tris(β-hydroxyethyl)isocyanurate.

PROCEDURE I

Cyanuric acid 43 grams (0.33 mole) was dissolved in 450 ml. of 2 N sodium hydroxide. To the solution, one gram of filter aid ("Hyflow") was added and filtered. To the clear solution in a 500 ml. round bottom flask, was added 80.5 grams (1 mole) of ethylene chlorohydrin. Immediately after the addition of the ethylene chlorohydrin a white solid precipitated out. The heterogeneous mixture was heated on the steam bath with stirring for three days. The solution was cooled in an ice bath and filtered. At this point the clear solution was acidic (pH 5–6). The clear solution was concentrated in a rotating evaporator to dryness. The resulting residue (quite viscous) was extracted with 400 ml. of hot dioxane and filtered. The solid sodium chloride was discarded, and the dioxane solution was then concentrated in a rotating evaporator under vacuum. The resulting viscous liquid weighed 80 grams; it was taken up with 50–100 ml. of isopropyl alcohol and allowed to stand. After several days, a white solid precipitated out. It was filtered, washed with cold isopropyl alcohol and crystallized once from dioxane. It weighed 20 grams, 24% of the theory, and melted at 130–132° C.

Analysis calculated for $C_9H_{15}N_3O_6$: C, 41.38, H, 5.79; N, 16.09

Analysis found for $C_9H_{15}N_3O_6$: C, 41.67; H, 5.87; N, 16.18

Its infra-red spectrum in KBr showed the following bands: 2.95 m., 3.0 m. and 3.1 m. for hydroxyl and 5.93 m. for

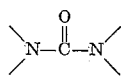

These absorptions are in agreement with its assigned structure.

PROCEDURE II

Cyanuric acid 65 grams was suspended in 748 ml. of water containing 14.4 g. of sodium hydroxide in a three liter four-neck flask, equipped with a mechanical stirrer, condenser, thermometer and addition funnel. The suspension was stirred and heated to 95° C. and a cold mixture of ethylene chlorohydrin 290 grams, water 390 grams, containing 80 grams of sodium hydroxide, was added dropwise over a period of 6–8 hours while maintaining the reaction temperature at about 95° C. After the addition was complete, the reaction mixture was clear and its pH was 8.6–9.1, it was allowed to stand overnight. The solution was concentrated under vacuum until no more water could be removed, and the residue, a mixture of a solid and an oil was extracted thoroughly with boiling dioxane. The combined hot dioxane washings were filtered and the solid sodium chloride was discarded. The dioxane solution was concentrated to a small volume and allowed to stand in the ice box at about 80° C. The solid which crystallized was filtered and washed with a small amount of cold isopropyl alcohol. It weighed 109 grams or 84% of the theoretical yield; it melted at 132–134° C. Mixed melting point with tris(β-hydroxyethyl)isocyanurate prepared in Procedure I did not depress. However, a mixed melting point with tris(β-hydroxyethyl)cyanurate, M.P. 130–132° C., depressed to 110–117° C. The infra-red spectrum in KBr showed it to be identical with tris(β-hydroxyethyl)isocyanurate.

In order to provide stable one component reactive systems that can be applied as a film on more or less continuous lengths of metal, I block the reactivity of the isocyanate either partially or completely with a thermally removable blocking agent such as a phenolic material or a substituted phenolic material, though volatile compounds containing enolizable active hydrogen such as malonic and acetoacetic esters will work. From a cost viewpoint the methyl group substituted phenols known as cresylic acids are preferred. In order to adjust viscosity of the coating mixtures, inert volatile organic solvents are added. These may be chosen from the hydrocarbons with a preference for the aromatic hydrocarbons, though the aforementioned cresylic acid may serve as a portion of a solvent system. The difficult solubility of tris(β-hydroxyethyl) isocyanurate requires that it either be reacted into solution, or if not, predissolved in a non-reactive polar solvent such as cyclohexanone or dimethyl formamide, or other very strong polar solvent, prior to reaction with MDI. For greatest ease of application continuously to metal, I prefer the following procedure:

In Part A.—A solution of tris(β-hydroxyethyl)isocyanurate in an inert solvent such as cyclohexanone is reacted with a solution of MDI in an inert solvent under conditions that will insure an excess of isocyanate groups at all times. A ratio of NCO to OH of 2.5 or more has been found satisfactory. Cresylic acid is then added to the mixture, reacting with the remaining NCO groups to block them.

In Part B.—MDI is reacted with tris(β-hydroxyethyl) isocyanurate both in solution in an inert solvent such as cyclohexanone, or even a mixture of cyclohexanone and cresylic acid (minor amount) which in this instance acts as a solvent only due to the faster rate of reaction between the primary reactants. Upon completion of the reaction, Part B is diluted with cresylic acid and mixed with Part A to form a heat activatable reactive system, suitable for coating metal either continuously or discontinuously. The scheme of using an NCO to OH ration of $n$ for Part A, and of $1/n$ for Part B can be extended indefinitely, but in practice best results obtain when $n$ equals about 3.

The following examples are given solely for purposes of illustration and are not to be considered as limiting the invention to these embodiments. Many modifications will be apparent to those skilled in the art without departing from the spirit or scope of the invention.

*Example 1*

The diphenylmethane diisocyanate (MDI) employed in the present example was "Nacconate 300," obtained from National Aniline Division, Allied Chemical Corporation. Commercial diphenylmethane diisocyanate is predominately the 4,4' isomer with some 2,4' isomer also being present.

*Part A.*—150 g. of MDI was dissolved in 60 g. of cyclohexanone at 60° C. A solution of 34.8 g. tris(β-hydroxyethyl)isocyanurate in 100 g. of cyclohexanone was prepared at 105–115° C. The resulting solution was maintained at 105–115° C. and was added intermittently in small portions with good stirring to the MDI solution over a 16 minute period. The temperature was kept below 80° C. The resulting syrup was yellow in color and had a slight haziness. After standing for 15 minutes, the reaction had gone to completion. 300 g. of cresylic acid (Cresylic Acid No. 36, Pitt-Consol Chemical Company) was added. The temperature was increased from 50 to 72° C. and an increase in viscosity occurred. The resulting product was stable and may be stored for extended periods if desired.

*Part B.*—104.4 g. tris(β-hydroxyethyl)isocyanurate was dissolved in 268.8 g. cyclohexanone and 11 g. Cresylic Acid No. 36 at 100–110° C. A solution of 50 g. diphenylmethane diisocyanate (Nacconate 300) was prepared in 20 g. of cyclohexanone at 60° C., and the MDI solution was added over a 5 minute period in small portions with good stirring. The temperature was maintained at 95–105° C. The resulting solution was allowed to stand for 10 minutes after the last addition in order to complete the reactions.

Part B was then mixed with Part A. 250 g. of cresylic acid and 347 g. of aromatic hydrocarbon (W.E.S. Oil, Allied Chemical Company, B.P. 329–455° F.) were then added. The final solution contained 20% non-volatiles, and had an NCO/OH ratio of 1.0.

*Example 2*

The composition of Example 1 was applied to AWG 29 copper wire on a conventional dip coating wire tower. Indicated oven temperatures were 450 to 633° F. and wire speed 45 feet per minute. The coating was smooth, with the average build being 1 mil on the diameter of the wire.

*Example 3*

*Part A.*—37.5 g. MDI was melted at 60° C. to a clear liquid. To this melt was added, in small portions over a 5-minute period, a solution of 8.7 g. tris(β-hydroxyethyl)isocyanurate in 25 g. cyclohexanone. This solution was prepared at 105–115° C. and was maintained at this temperature during the addition. Temperature of the isocyanate-isocyanurate reaction was kept below 75° C. Some cloudiness and a few flocculent particles developed during the reaction. Added 75 g. Cresylic Acid No. 36. The temperature rose to 82° C. and the product became more viscous.

*Part B.*—26.1 g. tris($\beta$-hydroxyethyl)isocyanurate was dissolved in 73.9 g. cyclohexanone at 115° C. Cooled to 95–100° C. and added 12.5 g. MDI. Reacted at 85° C. for 20 minutes. Solution not completely clear. 80.5 g. Cresylic Acid No. 36 was then added.

Part B (at 26° C.) was mixed with Part A (at 60° C.). Filtered to remove insoluble particles, and added 84.8 g. Cresylic Acid No. 36. The final solution contained 20% non-volatiles. NCO/OH ratio was 1.0.

Example 4

The composition of Example 3 was applied to 0.24 x 0.080 inch rectangular copper wire by dipping 6 or 7 inch lengths of wire into the solution, allowing excess liquid to drain, and then curing in an oven at 400° F. Three samples were prepared with cure times of 10 minutes, 20 minutes, and 45 minutes. Upon completion of one baking cycle, the sample wires were redipped, and the process repeated, including the oven curing. It was found that an increase of one to two mils in thickness of the wire had occurred as a result of the enamel film.

The three wire samples were then aged at 360° F. for 16 hours. After withdrawal from the aging oven and cooling to room temperature, the samples were clamped in a vise and twisted about their longitudinal axis until a 4-inch span had been subjected to 5 complete turns, so that the twisted wire assumed a helical form. No fracture of the resin film or loss of adhesion to the copper occurred during this test. The twisted wires were then replaced in the oven at 360° F. and subjected to heat shock for one hour. No failure occurred, indicating the lack of residual stresses in the deformed films.

When the same tests were repeated with a commercial polyurethane wire enamel not only were the enamel films darkened, dulled, and degraded during the heat-aging test, but there was complete failure on the twist test.

Example 5

Enameled wire from Example 2 was aged at 230° C. for one, two, and four days, along with a sample of commercial polyurethane wire. NEMA (National Electrical Manufacturers Association) scrape abrasion results were run on the aged wires, with the following results:

|  | Example 2, strokes | Commercial Wire, strokes |
|---|---|---|
| Original (unaged) | 16 | 60 |
| Aged 1 day | 27 | 1 |
| Aged 2 days | 25 | 1 |
| Aged 4 days | 23 | 1 |

This test shows the remarkable retention of adhesion and physical film and integrity exhibited by the products of the invention.

MODIFICATION OF OTHER ENAMELS BY TRIS($\beta$-HYDROXYETHYL)ISOCYANURATE

In the following examples many of the hydroxyl groups (which react with the isocyanate) are furnished by materials other than the $\beta$-hydroxyethyl isocyanurate. As previously indicated, a sufficient quantity of $\beta$-hydroxyethyl isocyanurate is used so that at least 10% of the hydroxyl groups reacting with isocyanate come from such isocyanurate.

Example 6

Part A-3 was prepared as follows: 3248.1 g. of MDI were dissolved in 1299.6 g. cyclohexanone at 60° C. To this solution was added, with good mechanical agitation, a hot solution (115–125° C.) of 904.5 g. tris($\beta$-hydroxyethyl)isocyanurate in 2559.6 g. cyclohexanone over a period of 75 minutes. Additions were made intermittently and in small quantities, maintaining the temperature below 60° at all times. (A similar preparation in which the temperature had been permitted to rise to 82° C. had gelled upon addition of the last portion of tris($\beta$-hydroxyethyl)isocyanurate.) The final product was very viscous but had not gelled. 6496.2 g. Cresylic Acid No. 36 was then added to block the NCO groups. The temperature rose to 68° C.

Part B-3 was prepared as follows: 1078.5 g. Resin X-2635 was dissolved in 2100 g. "W.E.S." Oil and 675 g. "Solvesso" 100 at 100° C. 633 g. MDI was then added and the reaction heated to 125° C. Reaction maintained at 125° C. for 35 minutes. Cloudiness developed at about 8 minutes. Upon completion of the reaction, 1598 g. Cresylic Acid No. 36 was added, then 169.5 g. Resin X-2637 and 82.5 g. "Multron" R-2. It was mixed well and reheated to 85° C. to facilitate solution of the solid resin. Resin X-2637 is a tetrol obtained from the Dow Chemical Company. It has the structure

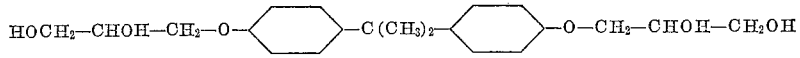

A final enamel was prepared by adding 8092 g. of previously described Part A-3 to the above Part B-3 followed by 647 g. Cresylic Acid No. 36, 1500 g. "W.E.S." Oil and 2655 g. "Solvesso" 100. The enamel had a viscosity of 90 cp. and a solids content of 22.45%. It yielded enamel wire having excellent scrape abrasion, cut-through and twist and heat shock properties.

Example 7

165 g. MDI was dissolved in 66 g. cyclohexanone. To this solution was added, with stirring, over a 15-minute period, a hot solution (105–120° C.) of 38.3 g. tris($\beta$-hydroxyethyl)isocyanurate in 110 g. cyclohexanone. After addition was complete, the yellowish syrup was allowed to stand for 20 minutes, then 330 g. cresylic acid was stirred in. It was "exothermed" to 75° C. and, designated as Part A-1.

Part B-1 was prepared by heating a suspension of 110 g. MDI in 444 g. Cresylic Acid No. 36 to 40° C. then adding 21 drops diethylethanolamine catalyst. It was "exothermed" to about 68° C. On cooling to room temperature 44 g. "W.E.S." Oil and 341 g. "Solvesso" 100 were added. 139 g. "Resin X-2635" and 60.7 g. "Multron" R-2 polyester were then added and heated to about 80° C. to dissolve the solid resin.

"Solvesso" 100 is a mixture of aromatic hydrocarbons from Esso Standard Oil Company and has a B.P. of 322–351° F.

"Resin X-2635" is a glycol from the Dow Chemical Company, and has the structure

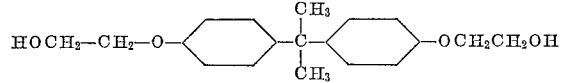

"Multron" R-2 (Mobay Chemical Company) is a branched polyester reported to be prepared by the reaction of 2.5 moles of trimethylolpropane and 0.5 mole of ethylene glycol with 3 moles of phthalic anhydride. It has a hydroxyl number in the range of about 385–402.

An enamel was prepared by mixing 142 g. Part A-1 with 227.8 g. Part B-1, then diluting with 22.7 g. Cresylic Acid No. 36, 90 g. "W.E.S." Oil and 30 g. "Solvesso" 100. The final enamel contained approximately 20% non-volatiles and had a viscosity of 25 cp. The final NCO/OH ratio was 1.245, with 50% of the OH groups being supplied by "Resin X–2635," 25% by "Multron" R–2, and 25% by tris($\beta$-hydroxyethyl)isocyanurate. Cresylic acid content of the final enamel was 34.7%, "W.E.S." Oil content 19.3%, "Solvesso" 100 content 19.15%, and cyclohexanone content 6.9%.

*Example 8*

Another enamel was prepared by dissolving 13.9 g. "Resin X–2635" in 227.8 g. Part B–1 (Example 7) with addition of 54.3 g. Cresylic Acid No. 36, 105 g. "W.E.S." Oil, and 40 g. "Solvesso" 100. 142 g. Part A–1 (Example 7) was then mixed in to yield an enamel having approximately 20% non-volatiles, a viscosity of 21 cp. and an NCO/OH ratio of 1.0. 60% of the OH groups were supplied by "Resin X–2635," 20% by "Multron" R–2 and 20% by tris($\beta$-hydroxyethyl)isocyanurate. Cresylic acid content of the final enamel was 35.9%, "W.E.S." Oil content 19.5%, "Solvesso" 100 content 18.55%, and cyclohexanone content 6.05%.

Because of their low viscosity and good coating properties the two enamels from Examples 7 and 8 could readily be applied to round copper wire by dip methods. Smooth coatings were obtained when the enamels were applied to AWG–29 copper wire on a conventional dip tower using 4 passes, with the temperature readings at 465–625° F. and a wire speed of 46 feet per minute. Electrical continuity of the films was excellent (0–4 breaks per 100 feet). Thermal cut-through tests were run on the wires so produced, using a method whereby two lengths of wire are criss-crossed (to form the shape of the letter "X"), a constant load is applied to the wires directly at the point of convergence, and the entire assembly is subjected to increasing temperatures in an oven until the insulation softens and permits electrical contact between the copper conductors. Cut-through values of 238C. for the first enamel and 249C. for the second were obtained. As a control, AWG–29 wire, which had been die-coated with an enamel prepared from 1 equivalent MDI, 0.75 equivalent "Resin X–2635," and 0.25 equivalent "Multron" R–2, was used. It gave a cut-through value, by the same test procedure, of 194C. It is thus seen that incorporation of 20–25% tris($\beta$-hydroxyethyl)isocyanurate (by equivalents) increases the thermal cut-through by 44 to 55C.

*Example 9*

Another modified enamel was made as follows: the preparation of Part A–1 (Example 7) was repeated but increasing the batch size tenfold. Designated as Part A–2, Part B–2 was prepared by adding 4.2 g. diethylethanolamine catalyst to 4444 g. Cresylic Acid No. 36, then adding 1100 g. MDI and heated to 95° C. When blocking reaction was complete, as evidenced by end of exothermic temperature increase, 3410 g. "Solvesso" 100, 440 g. "W.E.S." Oil and 607.2 g. "Multron" R–2 polyester were added. To the resulting solution was added 1390.4 g. "Resin X–2635" and the suspension heated to 80–85° C. to dissolve the solid, resin. Part A–2 was then added to Part B–2 and thoroughly mixed. 57.5 g. oil soluble red dye was then mixed in. The final, non-volatile content was 28% and the viscosity about 150 cp. NCO/OH ratio was 1.25, with 50% of the OH groups being supplied by "Resin X–2635," 25% by "Multron" R–2, and 25% by tris($\beta$-hydroxyethyl)isocyanurate. Solvent composition was cresylic acid 41.75%, "Solvesso" 100–18.3%, "W.E.S." Oil—2.4% and cyclohexanone—9.5%.

This enamel was applied to AWG–30 round copper gular copper wire by a hand dipping procedure in the laboratory, putting on two coats and curing samples at 400° F. for 10 minutes, 20 minutes, and 45 minutes respectively. Coating properties were good, and the wires withstood the standard twist and heat shock tests. Solderability was found to be excellent and apparently completely unimpaired by incorporation of the isocyanurate.

This enamel was applied to AWG–30 round copper wire on a commercial wire tower using a modified die-coating procedure. Satisfactory wire was produced having good film smoothness, electrical film continuity, elongation and adherence and flexibility properties. The scrape abrasion properties were particularly superior, being in the range of 40 to 60 strokes by a modified NEMA MW15–1955 test procedure, whereas unmodified enamels of the same general composition gave values of 6 to 14 strokes.

USE OF EXCESS ISOCYANATE

*Example 10*

7.0 g. of a solution of 20 g. MDI in 8 g. cyclohexanone (prepared by heating to 60° C.) was added to a solution of 10.4 g. tris($\beta$-hydroxyethyl)isocyanurate in 27 g. cyclohexanone and 1.1 g. Cresylic Acid No. 36. The addition was made in small portions, with good stirring, over a period of about 10 minutes. The tris($\beta$-hydroxyethyl)isocyanurate solution was prepared by heating to approximately 100 to 105° C. and maintaining at approximately 100° C. during the addition of the MDI solution. After addition of the MDI solution, the reaction was allowed to stand for 10 minutes. Then 100 g. of Part A, as described in Example 1, was added followed by 25 g. Cresylic Acid No. 36 and 35 g. "W.E.S." Oil. The components were mixed well and yielded a homogeneous solution with a calculated non-volatiles content of 21.5% and an NCO/OH ratio of 1.24.

The above enamel was applied to 0.24 x 0.080-inch rectangular copper wire, and cured at 400° F. for 10 minutes. The thickness of the resulting film was approximately 2 mils and the coating itself was hard, smooth, and free from defects. Thermal cut-through value was found to be 268° C., which indicates a very high degree of resistance to deformation at high temperatures. The use of excess isocyanate tends to improve cut-through properties of the resulting enamel. In general the preferred NCO/OH ratio is in the range of from about 0.9 to about 1.5.

The sample of Part A used in this experiment had been prepared 10 weeks previously, and had remained unchanged in clarity, viscosity and other characteristics during the intervening period. This illustrates the high degree of stability characterizing this intermediate product.

I claim:

1. The reaction product of diphenyl methane diisocyanate and a polyol, the ratio of NCO to alcoholic OH groups being in the approximate range 2:3 to 3:2, from 10 to 100 percent of the hydroxyl groups of said polyol being provided by tris($\beta$-hydroxyethyl)isocyanurate and from 90 to 0 percent of the hydroxyl groups in said polyol being provided by a polyol selected from the group consisting of polyether and polyester polyols and mixtures, thereof.

2. A solution comprising a mixture of: (A) the reaction product of tris($\beta$-hydroxyethyl)isocyanurate and diphenyl-methane diisocyanate from a reaction mixture in which from about 2.5 to about 3.0 equivalents of isocyanate groups are present for each equivalent of hydroxyl groups, said reaction product being blocked by reaction with a thermally releasable blocking agent, and (B) the reaction product of tris($\beta$-hydroxyethyl)isocyanurate and diphenylmethane diisocyanate from a reaction in which the hydroxyl groups are present in an excess over the isocyanate groups, in an inert organic solvent.

3. The composition described in claim 2 in which the blocking agent is cresylic acid.

4. The reaction product of 0.8 molar proportions to 1.2 molar proportions of diphenylmethane diisocyanate with 1.2 molar proportions to 0.8 molar proportions of tris($\beta$-hydroxyethyl)isocyanurate.

5. The process which comprises reacting diphenylmethane diisocyanate in solution with tris(β-hydroxyethyl)isocyanurate in solution, the ratio of NCO to alcoholic OH groups being in the approximate range 2:3 to 3:2.

6. The process which comprises reacting diphenylmethane diisocyanate in solution with tris(β-hydroxyethyl)isocyanurate in solution in proportions such that there are at least 2.5 equivalents of said diphenylmethane diisocyanate per equivalent of said tris(β-hydroxyethyl)isocyanurate, blocking the remaining unreacted isocyanate groups with a thermally releasable blocking agent, separately reacting diphenylmethane diisocyanate in solution with tris(β-hydroxyethylisocyanurate in solution in the proportions of at least 2.5 equivalents of tris(β-hydroxyethyl)isocyanurate per equivalent of diphenylmethane diisocyanate, and then mixing the two separately formed reaction products to form a stable storable composition in which the ratio of isocyanate groups to hydroxyethyl groups is in the range 3:2 to 2:3.

7. The process of claim 6 in which the blocking agent is cresylic acid.

8. The process which comprises reacting tris(β-hydroxyethyl)isocyanurate and diphenylmethane diisocyanate in proportions such that there are from about 2.5 to about 3.0 equivalents of isocyanate groups for each equivalent of hydroxyl group, reacting the unreacted isocyanate groups with a thermally releasable blocking agent, separately reacting from about 1.5 to about 3.0 equivalents of a polyol selected from the group consisting of tris(β-hydroxyethyl)isocyanurate, polyether polyols, polyester polyols and mixtures thereof, with one equivalent of diphenylmethane diisocyanate, said reactions being carried out in a solvent and with an overall ratio of NCO to alcoholic OH groups in the approximate range of 2:3 to 3:2, and then mixing the two separately formed reaction products to form a stable storable composition which, upon application of heat, will evolve the blocking agent and solvent to leave a polyurethane film.

9. The composition of claim 8 in which the thermally releasable blocking agent is cresylic acid.

10. The reaction product of tris(β-hydroxyethyl)isocyanurate and diphenylmethane diisocyanate from a reaction mixture in which at least 2.5 equivalents of isocyanate groups are present for each equivalent of hydroxyl groups.

11. The reaction product of claim 10 in which the excess isocyanate groups are reacted with a thermally releasable blocking agent.

12. The reaction product of claim 11 in which the blocking agent is cresylic acid.

13. A solution comprising of a mixture of: (A) the reaction product of tris(β-hydroxyethyl)isocyanurate and diphenylmethane diisocyanate from a reaction mixture in which from about 2.5 to about 3.0 equivalents of isocyanate groups are present for each equivalent of hydroxyl groups, said reaction product being blocked by reaction with a thermally releasable blocking agent, and (B) the reaction product of diphenylmethane diisocyanate and a polyol selected from the group consisting of tris(β-hydroxyethyl)isocyanurate, polyether polyol, polyester polyol, and mixtures thereof in which the hydroxyl groups are present in an excess over the isocyanate groups, the proportions being such that at least 10 percent of the hydroxyl groups reactive with isocyanate are derived from the tris(β-hydroxyethyl)isocyanurate and the ratio of NCO to alcoholic OH groups is in the approximate range of 2:3 to 3:2 in an inert organic solvent.

14. The reaction product obtained by heating the solution of claim 2 at a temperature sufficient to release the blocking agent and evaporate the solvent.

15. The reaction product obtained by heating the solution of claim 13 at a temperature sufficient to release the blocking agent and evaporate the solvent.

16. The process which comprises reacting tris(β-hydroxyethyl)isocyanurate and diphenylmethane diisocyanate in proportions such that there are at least 2.5 equivalent of isocyanate groups for each equivalent of hydroxyl group and reacting the unreacted hydroxyl groups with a thermally releasable blocking agent.

17. The process of claim 16 in which the thermally releasable blocking agent is cresylic acid.

18. A metal surface coated with a film of the reaction product of claim 1.

19. A metal surface coated with a thin adherent film of the reaction product of claim 15.

20. A copper wire coated with a thin adherent film obtained by applying the solution of claim 2 and heating to release the blocking agent and evaporate the solvent.

21. A copper wire coated with a thin adherent film obtained by applying the solution of claim 13 and heating to release the blocking agent and evaporate the solvent.

References Cited by the Examiner

UNITED STATES PATENTS

| | | | |
|---|---|---|---|
| 2,764,565 | 9/56 | Hoppe | 260—77.5 |
| 2,952,665 | 9/60 | Bunge | 260—77.5 |
| 2,954,365 | 9/60 | Windemuth | 260—248 |
| 3,088,948 | 5/63 | Little | 260—584 |

LEON J. BERCOVITZ, *Primary Examiner.*

H. N. BURSTEIN, DONALD E. CZAJA, *Examiners.*

UNITED STATES PATENT OFFICE
CERTIFICATE OF CORRECTION

Patent No. 3,174,950                                    March 23, 1965

David E. Cordier

It is hereby certified that error appears in the above numbered patent requiring correction and that the said Letters Patent should read as corrected below.

Column 7, lines 70 and 71, strike out "This enamel was applied to AWG-30 round copper gular" and insert instead -- This enamel was applied to 0.24 × 0.080 inch rectangular --; column 9, line 13, for "tris(β-hydroxyethylisocyanurate" read -- tris(β-hydroxyethyl)isocyanurate --.

Signed and sealed this 3rd day of August 1965.

(SEAL)
Attest:

ERNEST W. SWIDER
Attesting Officer

EDWARD J. BRENNER
Commissioner of Patents